United States Patent
Sreekanth

(10) Patent No.: US 7,941,400 B2
(45) Date of Patent: May 10, 2011

(54) SYSTEMS, METHODS AND COMPUTER PROGRAM PRODUCTS FOR MAINTAINING A STATE OF A DOCUMENT IN A DOCUMENT-CENTRIC MODEL TO MAINTAIN A TASK ACROSS SYSTEMS WITH THE DOCUMENT

(75) Inventor: Kannepalli Venkata Sreekanth, Pune (IN)

(73) Assignee: International Business Machines Corporation, Armonk, NY (US)

(*) Notice: Subject to any disclaimer, the term of this patent is extended or adjusted under 35 U.S.C. 154(b) by 719 days.

(21) Appl. No.: 11/953,320

(22) Filed: Dec. 10, 2007

(65) Prior Publication Data
US 2009/0150453 A1  Jun. 11, 2009

(51) Int. Cl.
*G06F 17/00* (2006.01)

(52) U.S. Cl. ........................ 707/622; 707/695

(58) Field of Classification Search .......... 707/608, 707/610, 622, 640, 688, 694, 727, 728; 715/224, 715/225, 254, 255, 260, 271
See application file for complete search history.

(56) References Cited

U.S. PATENT DOCUMENTS

| | | | |
|---|---|---|---|
| 5,613,134 A | 3/1997 | Lucus et al. | |
| 6,992,687 B1 | 1/2006 | Baird et al. | |
| 7,512,892 B2 * | 3/2009 | Sellers et al. | 715/764 |
| 2004/0003371 A1 * | 1/2004 | Coulthard et al. | 717/101 |
| 2005/0022113 A1 | 1/2005 | Hanlon | |

FOREIGN PATENT DOCUMENTS

WO  98/06054 A1  2/1998

OTHER PUBLICATIONS

Mobipocket Reader, [online]; [retrieved on Dec. 7, 2007]; retrieved from the Internet http://66.179.52.179/franklin/data/public/manuals/mobipocketreaderforwince.pdf.

* cited by examiner

*Primary Examiner* — Fred I Ehichioya
(74) *Attorney, Agent, or Firm* — Cantor Colburn LLP; Raymond Szeto

(57) ABSTRACT

Systems, methods, and computer program for maintaining a state of a document in a document-centric model to maintain a task across systems with the document. Exemplary embodiments include a method for maintaining a state of a document in a document-centric model to maintain a task across systems with the document, the method including opening the document on a first device, loading and rendering the document on the first device, activating a first plugin on the first device, checking the document for a marker record in a first marker registry database associated with the first device, performing scrolling operations to position a view of the user at a specified location as defined in the marker entry and performing a synchronization between the first device and a second device, the synchronization including transferring the marker entry to a second marker registry database associated with the second device.

2 Claims, 4 Drawing Sheets

SYSTEMS, METHODS AND COMPUTER PROGRAM PRODUCTS FOR MAINTAINING A STATE OF A DOCUMENT IN A DOCUMENT-CENTRIC MODEL TO MAINTAIN A TASK ACROSS SYSTEMS WITH THE DOCUMENT

TRADEMARKS

IBM® is a registered trademark of International Business Machines Corporation, Armonk, N.Y. U.S.A. Other names used herein may be registered trademarks, trademarks or product names of International Business Machines Corporation or other companies.

BACKGROUND OF THE INVENTION

1. Field of the Invention

This invention relates to spelling rules, and particularly to systems, methods, and computer program products for maintaining a state of a document in a document-centric model to maintain a task across systems with the document.

2. Description of Background

Reading documents on PDA's is becoming increasingly popular because of the advent of new devices which have good resolution screens and large memory capacity. Many users copy documents from desktop computers into their PDA's for reading during travel or in places where accessing their desktop computers is not possible. The availability of documents on the move is very useful for many individuals.

When the documents are very large, users have to remember the location where they last stopped reading the file and need to make few searches before they actually reach the location, which becomes cumbersome when the user switches between PDA and the desktop for reading the same document.

Currently users use Bookmark Feature of the document viewers to quickly traverse to certain sections of any document. The problem with this, in the current scenario, is that the user is not automatically taken to the bookmark and the document needs to be copied every time the user adds a bookmark. For example, in MS Excel, when a user opens a document and places cursor on a cell and closes the document, he is taken to the same cell when he opens the document again. But if this behavior has to occur between two systems then the user has to always copy the document between the systems. Currently, there are solutions used for saving state of applications. In these solutions, the current state of the application, including open documents, is saved. However, the current solutions have certain disadvantages such the entire application state is migrated and recreated on the second system.

SUMMARY OF THE INVENTION

Exemplary embodiments include a method for maintaining a state of a document in a document-centric model to maintain a task across systems with the document, the method including opening the document on a first device, loading and rendering the document on the first device, activating a first plugin on the first device, checking the document for a marker record in a first marker registry database associated with the first device, in response to a presence of the marker in the first marker registry database reading a marker entry in the marker record, performing scrolling operations to position a view of the user at a specified location as defined in the marker entry and performing a synchronization between the first device and a second device, the synchronization including transferring the marker entry to a second marker registry database associated with the second device.

System and computer program products corresponding to the above-summarized methods are also described and claimed herein.

Additional features and advantages are realized through the techniques of the present invention. Other embodiments and aspects of the invention are described in detail herein and are considered a part of the claimed invention. For a better understanding of the invention with advantages and features, refer to the description and to the drawings.

Technical Effects

As a result of the summarized invention, technically we have achieved a solution, which provides systems and methods for maintaining a state of a document in a document-centric model such that users are able to continue their task across systems with the document.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

The detailed description explains the preferred embodiments of the invention, together with advantages and features, by way of example with reference to the drawings.

DETAILED DESCRIPTION OF THE INVENTION

In exemplary embodiments, the systems and methods described herein allow users to continue reading a document in a device (e.g., a personal digital assistant (PDA)) from exactly the same location where they had stopped reading on another device, such as on their desktop on a personal computer (PC). The systems and methods described herein also work in reverse, that is, when the user opens the document on the desktop the document is taken to the same location where they stopped reading the document on the PDA.

In a first example, the user opens a document on the desktop. The reader reads the document and stops at a particular location. The user then transfers the document to his PDA. It is appreciated that if the document already resides on the PDA, then the document may not transfer. The user then performs a sync operation. The user then opens the document on the PDA. The document reader then navigates the user to the location where the location had stopped reading the document on the desktop.

In a second example, the user opens a document on the PDA. The user then reads the document to a particular location on the PDA and closes the document. The user then performs a sync operation and then subsequently opens the document on the desktop. The document reader then navigates the user to the location where the user ceased reading the document on the PDA In another example, the systems and methods perform the same functions within the same device. The user can open the document on any device (e.g. desktop, PDA). The reader reads the document and stops at a particular location and closes the document. The user then opens the document on the same device in which the user closed the document. The document reader then navigates the user to the location where the user ceased reading the document.

In the above examples, the actions are described for reading the document, in which the data in the document has not changed. In exemplary embodiments, if the data in the document has changed, the user also copies the document between the systems thereby ensuring consistency.

Figure 1:
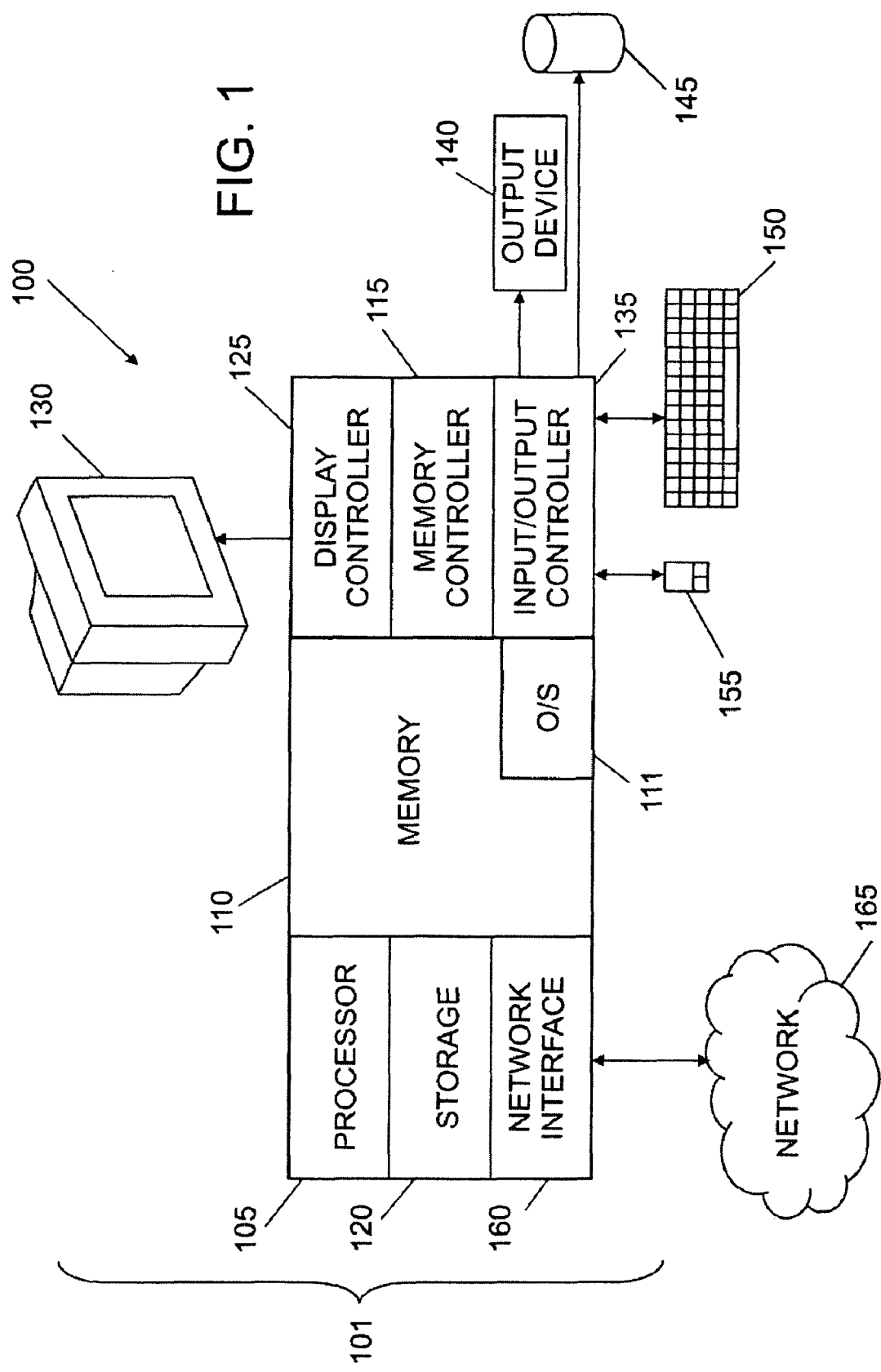
FIG. 1 illustrates an exemplary embodiment of a system for maintaining a state of a document in a document-centric model to maintain a task across systems with the document.

FIG. 1 illustrates an exemplary embodiment of a system 100 for maintaining a state of a document in a document-centric model to maintain a task across systems with the document. The methods described herein can be implemented in software (e.g., firmware), hardware, or a combination thereof. In exemplary embodiments, the methods described herein are implemented in software, as an executable program, and is executed by a special or general-purpose digital computer, such as a personal computer, workstation, minicomputer, or mainframe computer. The system 100 therefore includes general-purpose computer 101.

In exemplary embodiments, in terms of hardware architecture, as shown in FIG. 1, the computer 1101 includes a processor 101, memory 110 coupled to a memory controller 115, and one or more input and/or output (I/O) devices 140, 145 (or peripherals, such as the PDA as described above) that are communicatively coupled via a local input/output controller 135. The input/output controller 135 can be, for example but not limited to, one or more buses or other wired or wireless connections, as is known in the art. The input/output controller 135 may have additional elements, which are omitted for simplicity, such as controllers, buffers (caches), drivers, repeaters, and receivers, to enable communications. Further, the local interface may include address, control, aid/or data connections to enable appropriate communications among the aforementioned components.

The processor 105 is a hardware device for executing software, particularly that stored in memory 110. The processor 105 can be any custom made or commercially available processor, a central processing unit (CPU), an auxiliary processor among several processors associated with the computer 101, a semiconductor based microprocessor (in the form of a microchip or chip set), a macroprocessor, or generally any device for executing software instructions.

The memory 110 can include any one or combination of volatile memory elements (e.g., random access memory (RAM, such as DRAM, SRAM, SDRAM, etc.)) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 110 may incorporate electronic, magnetic, optical, and/or other types of storage media. Note that the memory 110 can have a distributed architecture, where various components are situated remote from one another, but can be accessed by the processor 105.

The software in memory 110 may include one or more separate programs, each of which comprises an ordered listing of executable instructions for implementing logical functions. In the example of FIG. 1, the software in the memory 110 includes the document state methods described herein in accordance with exemplary embodiments and a suitable operating system (OS) 111. The operating system 111 essentially controls the execution of other computer programs, such the document state systems and methods described herein, and provides scheduling, input-output control, file and data management, memory management, and communication control and related services.

The document state methods described herein may be in the form of a source program, executable program (object code), script, or any other entity comprising a set of instructions to be performed. When a source program, then the program needs to be translated via a compiler, assembler, interpreter, or the like, which may or may not be included within the memory 110, so as to operate properly in connection with the O/S 111. Furthermore, the document state methods can be written as an object oriented programming language, which has classes of data and methods, or a procedure programming language, which has routines, subroutines, and/or functions.

In exemplary embodiments, a conventional keyboard 150 and mouse 155 can be coupled to the input/output controller 135. Other output devices such as the I/O devices 140, 145 may include input devices, for example but not limited to a printer, a scanner, microphone, and the like. Finally, the I/O devices 140, 145 may further include devices that communicate both inputs and outputs, for instance but not limited to, a NIC or modulator/demodulator (for accessing other files, devices, systems, or a network), a radio frequency (RF) or other transceiver, a telephonic interface, a bridge, a router, and the like. The system 100 can further include a display controller 125 coupled to a display 130. In exemplary embodiments, the system 100 can further include a network interface 160 for coupling to a network 165. The network 165 can be an IP-based network for communication between the computer 101 and any external server, client and the like via a broadband connection. The network 165 transmits and receives data between the computer 101 and external systems. In exemplary embodiments, network 165 can be a managed IP network administered by a service provider. The network 165 may be implemented in a wireless fashion, e.g., using wireless protocols and technologies, such as WiFi, WiMax, etc. The network 165 can also be a packet-switched network such as a local area network, wide area network, metropolitan area network, Internet network, or other similar type of network environment. She network 165 may be a fixed wireless network, a wireless local area network (LAN), a wireless wide area network (WAN) a personal area network (IRAN), a virtual private network (VPN), intranet or other suitable network system and includes equipment for receiving and transmitting signals.

If the computer 101 is a PC, workstation, intelligent device or the like, the software in the memory 110 may further include a basic input output system (BIOS) (omitted for simplicity). The BIOS is a set of essential software routines that initialize and test hardware at startup, start the OS 111, and support the transfer of data among the hardware devices. The BIOS is stored in ROM so that the BIOS can be executed when the computer 101 is activated.

When the computer 101 is in operation, the processor 105 is configured to execute software stored within the memory 110, to communicate data to and from die memory 110, and to generally control operations of the computer 101 pursuant to the software. The document state methods described herein and the OS 111, in whole or in part, but typically the latter, are read by the processor 105, perhaps buffered within the processor 105, and then executed.

When the systems and methods described herein are implemented in software, as is shown in FIG. 1, it the methods can be stored on any computer readable medium, such as storage 120, for use by or in connection with any computer related system or method. In the context of this document, a computer readable medium is an) electronic, magnetic, optical, or other physical device or means that can contain or store a computer program for use by or in connection with a computer related system or method. The document state methods described herein can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In exemplary embodiments, a "computer-readable medium" can be any means that can store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

In exemplary embodiments, where the document state methods are implemented in hardware, the document state methods described herein can implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

In exemplary embodiments, the systems and methods described herein synchronize the "last reading location" called as a "marker" between the desktop and the PDA for those documents that are going to exist on both the device. Document viewers create these "markers". The specification of such markers depends on the format and reference to an element in the actual document and not any point on the view (i.e. the screen coordinates or view coordinates are not used). The systems and methods described herein identify the marker as now described.

In exemplary embodiments, for PDF documents the marker can be the page number of the first page in the current view. In exemplary embodiments, for word processing documents (e.g., Word): 1) if the cursor is in the current view of the user, the marker can be the line in which the cursor is placed, 2) if the cursor is not in the view of the user, the marker can be the first line on the top left corner of the current view. In exemplary embodiments, for spreadsheet documents (e.g., Excel), the marker can be the worksheet and the cell number. In exemplary embodiments, for slide presentation documents (e.g., PowerPoint), the marker can be the currently selected slide number. In exemplary embodiments, for plain text documents, the marker can be the current line number and column. In exemplary embodiments, for network browser applications (e.g., Internet Explorer), the marker can be the last visited page link, which allows users to continue at the page where the user last visited. In an example, the marker for text documents can be "10,2" (i.e. line number and column number). It is appreciated that the systems and methods described herein can include other document formats as well.

In exemplary embodiments, the systems and methods described herein can implement a registry, which is database/file that is structured with entries including: 1) document name, 2) document location on desktop, 3) document location on PDA, 4) marker (based on the marker specification for each file format, as discussed above), and 5) last update time.

Figure 2:
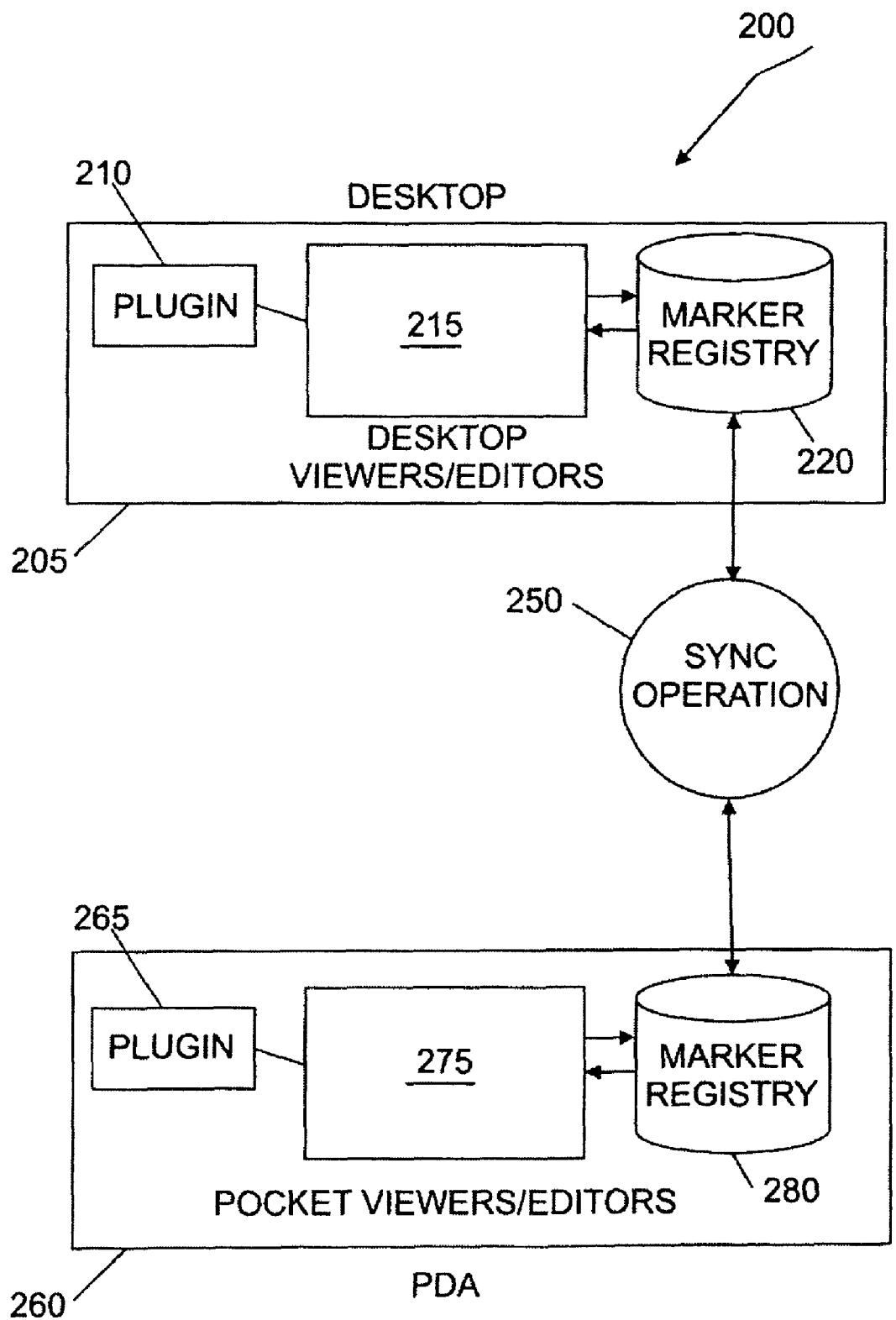
FIG. 2 illustrates a system block diagram of a synchronization between a desktop and a PDA in accordance with exemplary embodiments.

In exemplary embodiments, a plugin can be implemented to set markers and store registry data. In exemplary embodiments, the plugin can be a code component of the respective application or an ActiveX component built to work on top of the application. FIG. 2 illustrates a system block diagram 200 of a synchronization 250 between a desktop 205 and a PDA 260 in accordance with exemplary embodiments. The desktop 205 can include a plugin 210 as discussed above, a document viewer 215, and a marker registry 220 as discussed above. The PDA 260 can include a plugin 265 as discussed above, a document viewer 270, and a marker registry 275 as discussed above.

Figure 3:
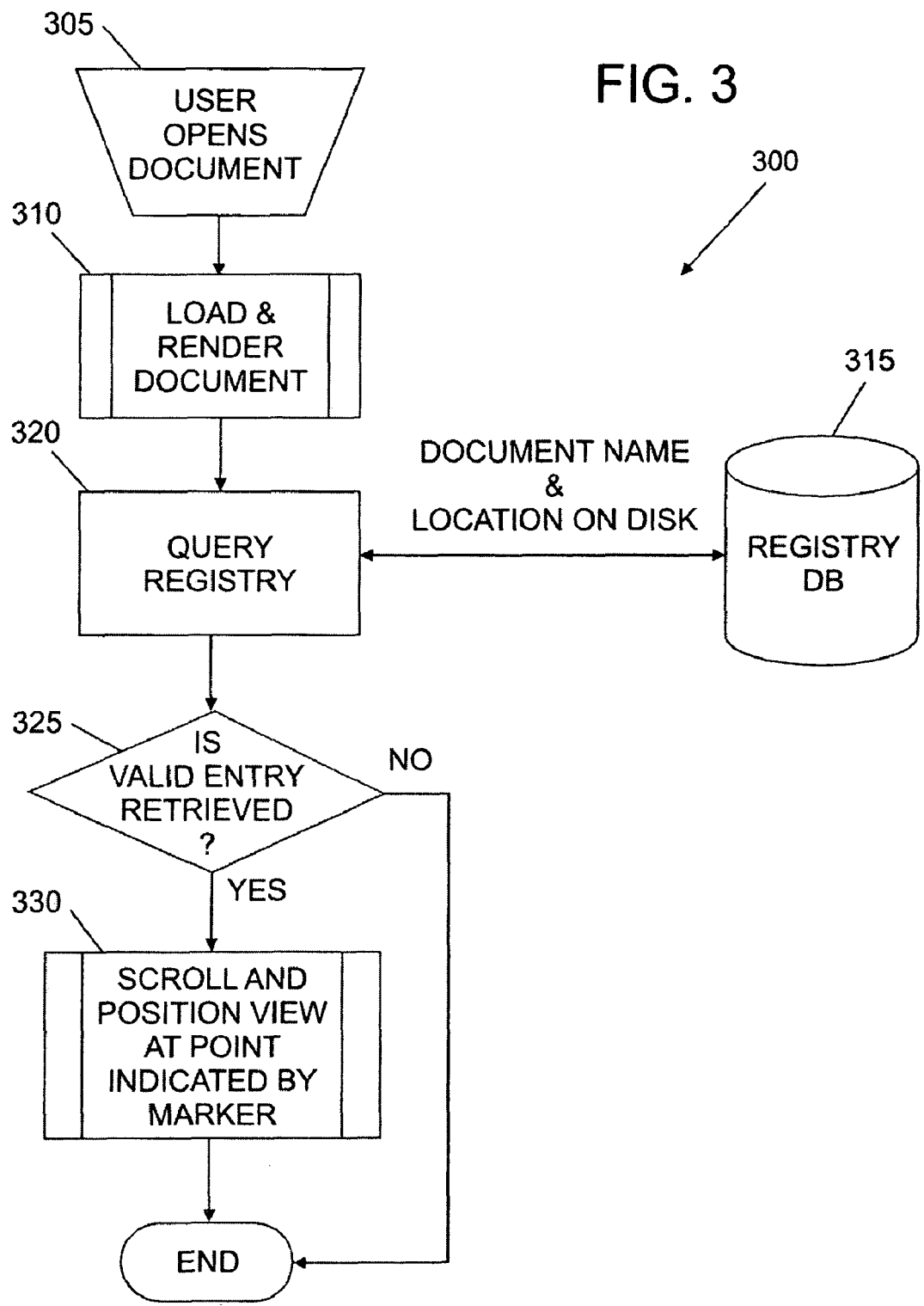
FIG. 3 illustrates a flowchart of a method for opening a document on either the desktop or the PDA.

FIG. 3 illustrates a flowchart of a method 300 for opening a document on either the desktop 205 or the PDA 260. At block 305, the user opens a document on either the desktop 205 or the PDA 260. At block 310, the respective application loads and renders the document. The respective plugin 210, 265 becomes activated after the document has been completely read and rendered by the respective reader 215, 275. In exemplary embodiments, the plugin 210, 265 checks if the document has any marker record in the marker registry database 315 by querying based on a combination of Document name and location of the document in the system at block 320. The method 300 then checks if a valid entry is retrieved at block 325. If at block 325, there is no entry in the database 315, the plugin 210, 265 does not do any work and the method 300 ends. If at block 325, there is an entry the database 315, the plugin 210, 265 reads the marker entry and performs scroll operations to position the view at the specified location as defined in the marker entry at block 330.

Figure 4:
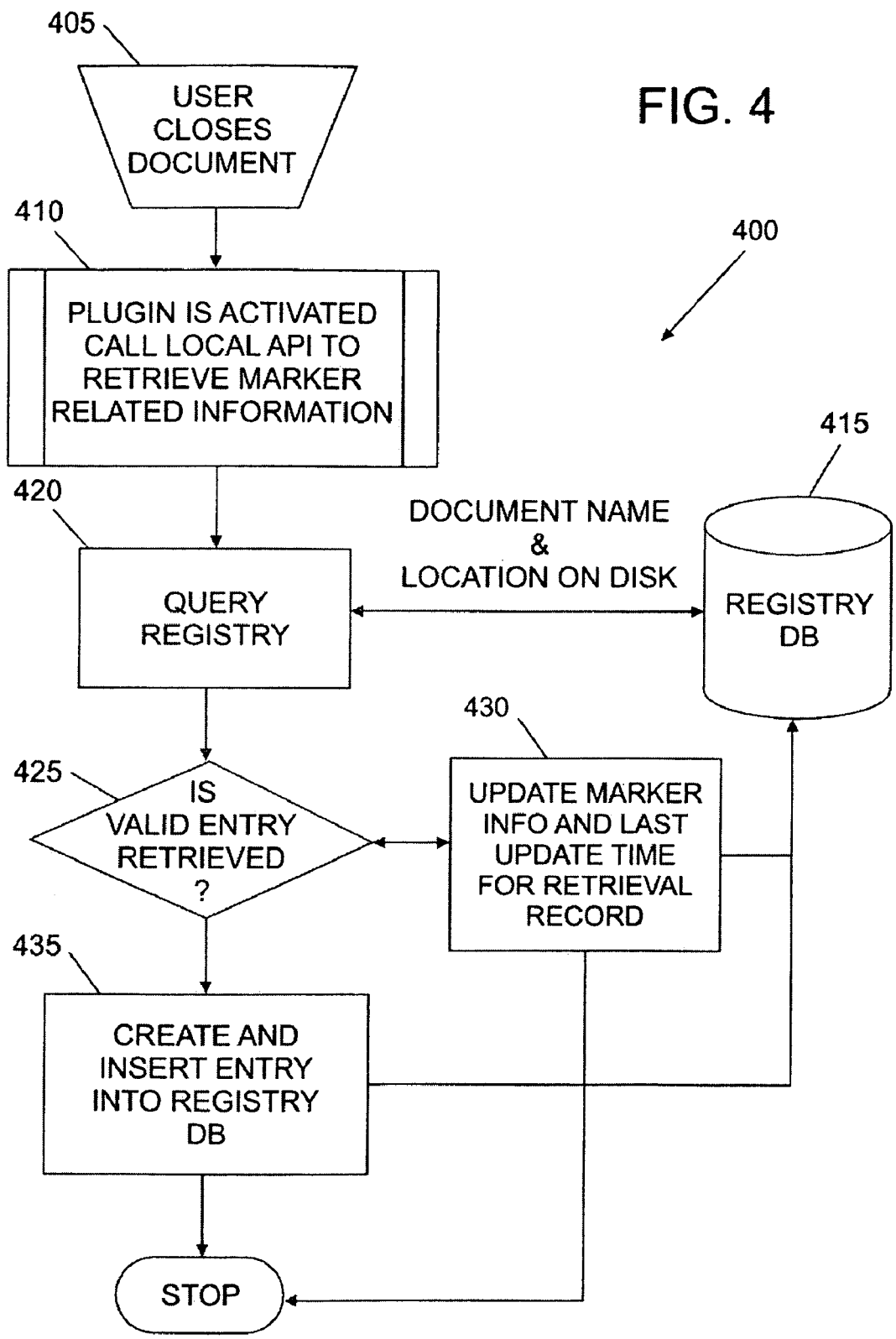
FIG. 4 illustrates a flowchart of a method for closing a document on either the desktop or the PDA.

FIG. 4 illustrates a flowchart of a method 400 for closing a document on either the desk-top 205 or the PDA 260. At block 405, the user closes the document. At block 410, the plugin 210, 265 is activated on the event of window close. In exemplary embodiments, the plugin 210, 265 uses native application API to retrieve the required marker Details. The plugin then creates an entry in the marker registry database 415 at block 420. At block 425, the method 400 determines if a valid entry is received. If at block 425, the marker registry 415 already has an entry for the same document, identified by a combination of the document name and location of the document in the system, then the registry 415 is updated with the new marker at block 430. If at block 425, the marker registry does not have an entry for the same document, then at block 435, a new entry is made in the Registry database 415. In exemplary embodiments, the update operation updates the fields for marker information and current time.

In exemplary embodiments, during a sync operation, using a special conduit, the marker registry databases 315, 4515 on the desktop 205 and the PDA 260 are synchronized. The markers that belong to the following type of documents are synced: 1) all new documents being transferred between the devices, 2) documents that exist on both the devices. This synchronization ensures that only those markers are synced which are needed. In exemplary embodiments, the sync operation is responsible for maintaining the relationship between the files residing on the desktop and the PDA. In exemplary embodiments, the sync operation follows the standard database synchronization logic. The database/registry has a field called last update date time for all the records updated. This field in the active system can be compared with the system being synced up to determine which record is current. The most recent record is taken and updated over the older record. To do this action over a standard sync operation a conduit application needs to be written which compare records at both ends and choose the most recent one. Optionally, some document formats are translated when copied onto the PDAs, the conduit can translate the markers also if necessary. The user may provide a visual option to place a marker on any document.

The capabilities of the present invention can be implemented in software, firmware, hardware or some combination thereof.

As one example, one or more aspects of the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A method for maintaining a state of a document in a document-centric model to maintain a task across systems with the document, the method consisting of:
   opening the document on a first device;
   loading and renderin the document on the first device;
   activating a first plugin on the first device;
   checking the document for a marker record in a first marker registry database associated with the first device;
   in response to a presence of the marker in the first marker registry database:
      reading a marker entry in the marker record;
      performing scrolling operations to position a view of the user at a specified location as defined in the marker entry;
   performing a synchronization between the first device and a second device, the synchronization including transferring the marker entry to a second marker registry database associated with the second device;
   closing the document on the first device;
   activating the first plugin in response to a closing of a window;
   retrieving details associated with a marker associated with the marker record;
   in response to a determination that the marker entry exists, updating the marker entry;
   in response to an absence of a marker entry in the first marker registry database, creating a new marker entry in the first marker registry database; and
   updating a marker information data field and a current time data field associated with the marker entry.

2. The method as claimed in claim 1 further consisting of:
   opening the document on the second device;
   loading and rendering the document on the second device;
   activating a second plugin on the second device;
   checking the document for a marker record in the second marker registry database associated with the second device; and
   in response to a presence of the marker in the second marker registry database:
      reading the marker entry in the marker record; and
      performing scrolling operations to position a view of the user at a specified location as defined in the marker entry.

* * * * *